Aug. 19, 1952 — C. L. GERLACH — 2,607,361
BOTTLE WASHING MACHINE
Filed Sept. 17, 1947 — 3 Sheets-Sheet 1

INVENTOR.
CHARLES L. GERLACH
BY John W. Michael
ATTORNEY.

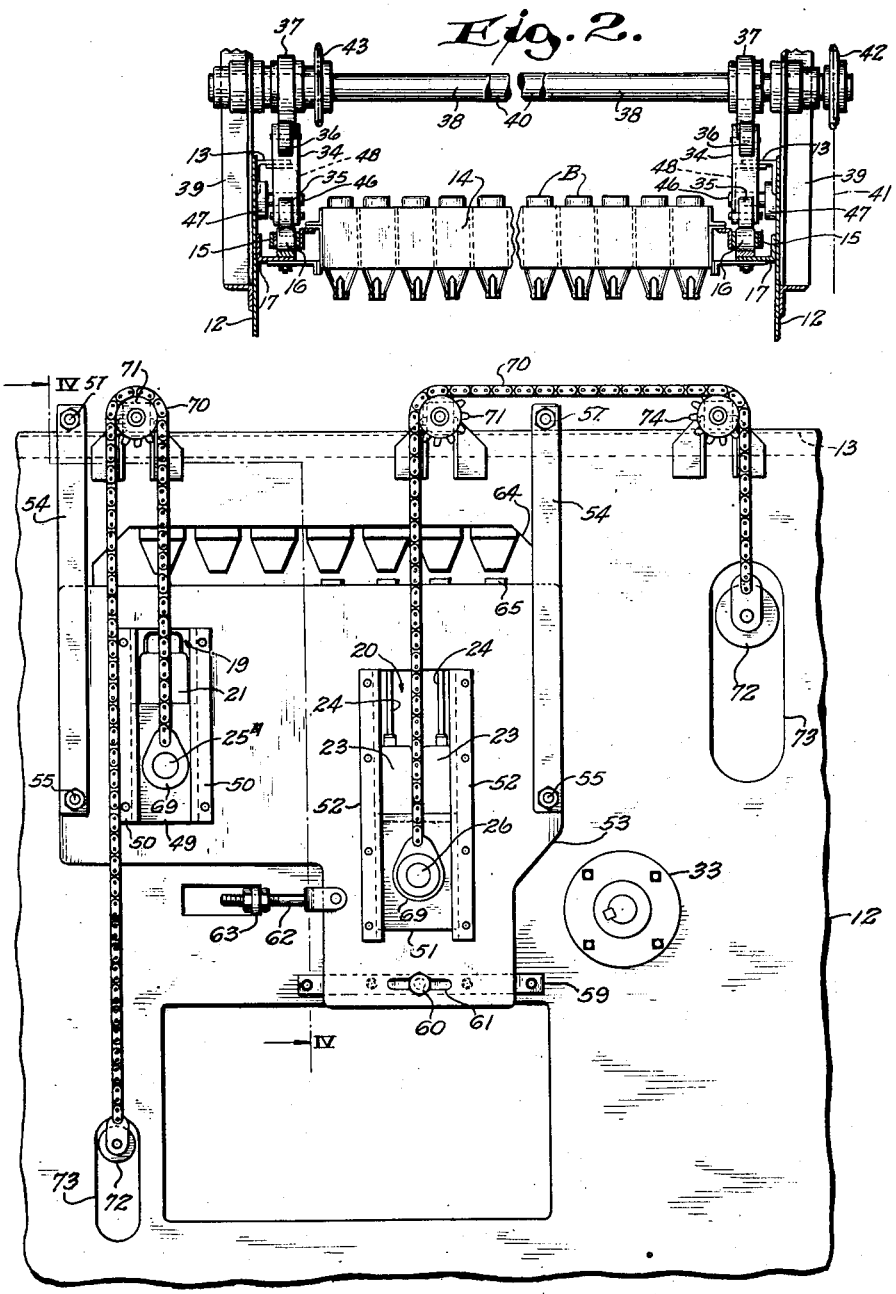

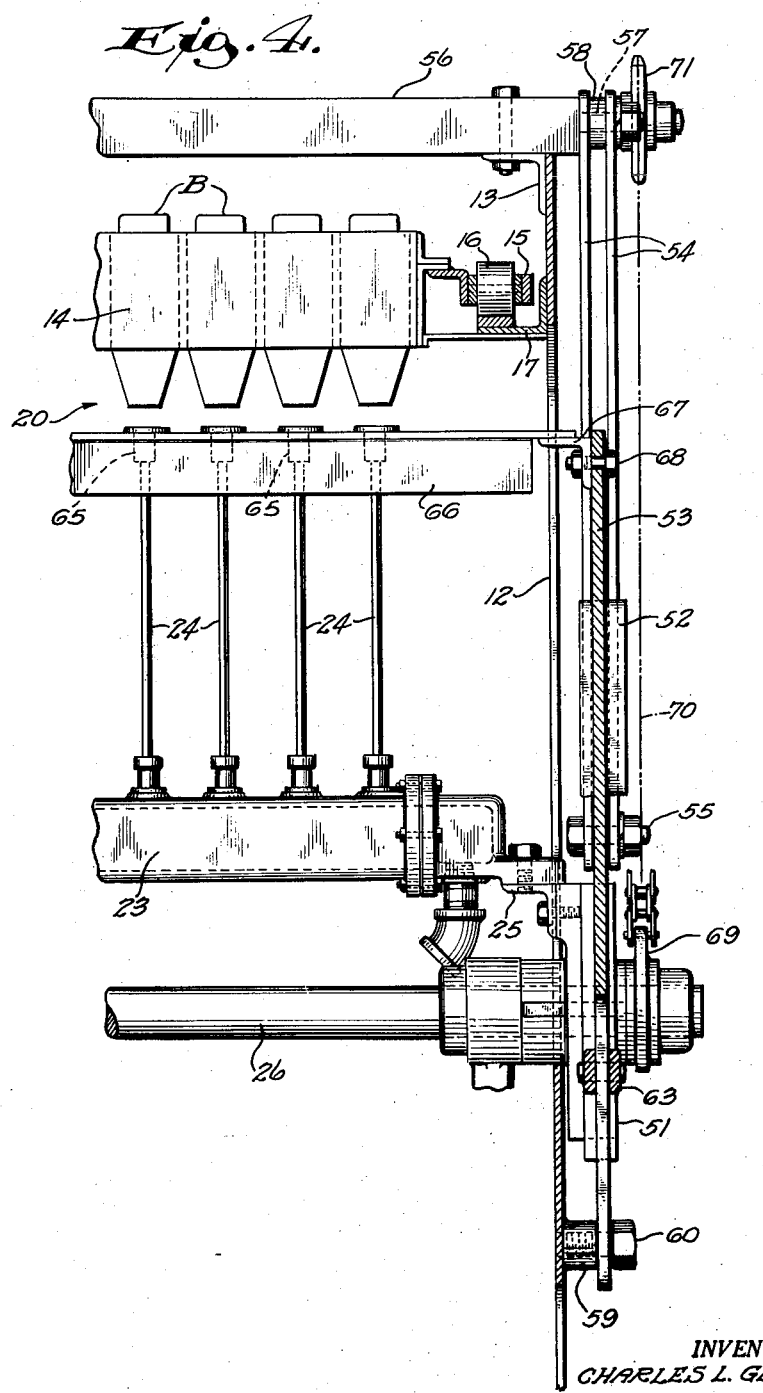

Patented Aug. 19, 1952

2,607,361

UNITED STATES PATENT OFFICE 2,607,361

BOTTLE WASHING MACHINE

Charles L. Gerlach, Waukesha, Wis., assignor to Michael Yundt Company, Waukesha, Wis., a corporation of Wisconsin Application September 17, 1947, Serial No. 774,587

2 Claims. (Cl. 134—129)

This invention relates to improvements in bottle-washing machines.

In bottle-washing machines of the type presently used, the bottles are placed in holders carried by an endless conveyor by which they are transferred, without removal, through warm water pre-rinse, soaking tanks and vapor compartments of varying temperatures, until they are ready for an internal rinse and internal cleansing. To perform the rinsing and cleansing the conveyor is advanced in steps and stopped between each step. When stopped distributing and mixing heads provided with specially designed nozzles are moved so that the nozzles enter into the bottles through their necks. As the nozzles travel through the bottles jets of water under pressure for the rinse and jets of water and air or steam under pressure for the cleansing are blasted against the interior surface of the bottle at high velocity. It is customary to employ a distributing head and support for the nozzles for the internal rinse and a mixing and distributing head for the nozzles for the internal cleansing. Several of the mixing heads may be grouped and operated as a unit for more efficient cleaning. Heretofore it has been the practice to mount the rinsing head and the cleansing head so that they were individually adjustable along the direction of travel of the conveyor to establish an alinement between the necks of the bottles as they were stopped in the rinsing and cleansing stations and the nozzles. As frequent adjustments are needed because of variations in bottles and other reasons, these individual adjustments are time-consuming and many times result in improper adjustment of one head with respect to the other head. Even when such adjustments are properly made, the "creep" of the conveyor will cause the bottles to stop at varying places within the stations. As a consequence the openings of the bottles often will not be in proper alinement with the nozzles and the bottles will be broken or chipped or the washer jammed.

It is an object of this invention, therefore, to provide a bottle-washing machine in which the "creep" of a conveyor advanced by steps is offset and the movement of each bottle carrier arrested at the same place in the rinsing and cleansing stations.

Another object of the invention is to provide a bottle-washing machine in which the rinsing head and cleansing head are simultaneously readily adjusted.

These objects are obtained: by providing the bottle-washing machine with a positioner which will automatically engage the bottle conveyor after it has been advanced a step and shift it to and lock it in a predetermined position to successively arrest each bottle carrier in the same place in the rinsing and cleansing stations; by mounting the rinsing head and cleansing heads so that in operation they will move in parallel fixedly spaced paths which paths are adjustable as a unit along the direction of the travel of the conveyor. In the case of a bottle conveyor employing a link type chain, the positioner is pivoted at a fixed point on the supporting frame or housing of the conveyor close to the rinsing and cleansing stations. The positioner is provided with a chain-engaging portion adapted to engage one or both of two adjacent chain pins or rollers of a link. If the chain has stopped with a link centrally alined with the chain-engaging portion, such portion will engage both pins or rollers. If the chain has stopped with a link unalined with such portion, such portion will engage only one pin or roller and the positioner will be in a raised position. When force is applied to the raised positioner urging it toward the link, the link will be shifted until the chain-engaging portion evenly contacts both pins or rollers. Thus a link is positively set in a predetermined position relative to the conveyor support. To supply sufficient force to the positioner to accomplish such adjusting and locking of the chain, there is provided a cam operated in synchronism with the advancing mechanism which (when the means for advancing the conveyor by steps is stopped) presses against the chain positioner. Thus each link is successively positioned in the same place and the bottle carriers always stop at the same place in the rinsing and cleansing stations in spite of any creep of the conveyor. To adjust the rinsing and cleansing heads for unitary adjustment, their ends at each side of the machine are guided for parallel movement by two spaced guides mounted in a plate on each side of the machine. These plates are movably mounted on the body of the machine so as to have limited movement along the direction of travel of the conveyor. With the conveyor in locked position these plates may be adjusted by a screw and nut arrangement until the nozzles of all heads are in alinement with the openings of bottles in the bottle carriers in the rinsing and cleansing stations. The alinement may be tested by elevating the heads through the customary mechanism.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 2 is a fragmentary sectional view taken on the line 2—2 of Fig. 1;

Fig. 3 is an enlarged fragmentary plan view of the adjustable mounting for the rinsing and cleansing heads as viewed in Fig. 1; and Fig. 4 is a fragmentary enlarged sectional view taken on the line 4—4 of Fig. 3.

Figure 1:
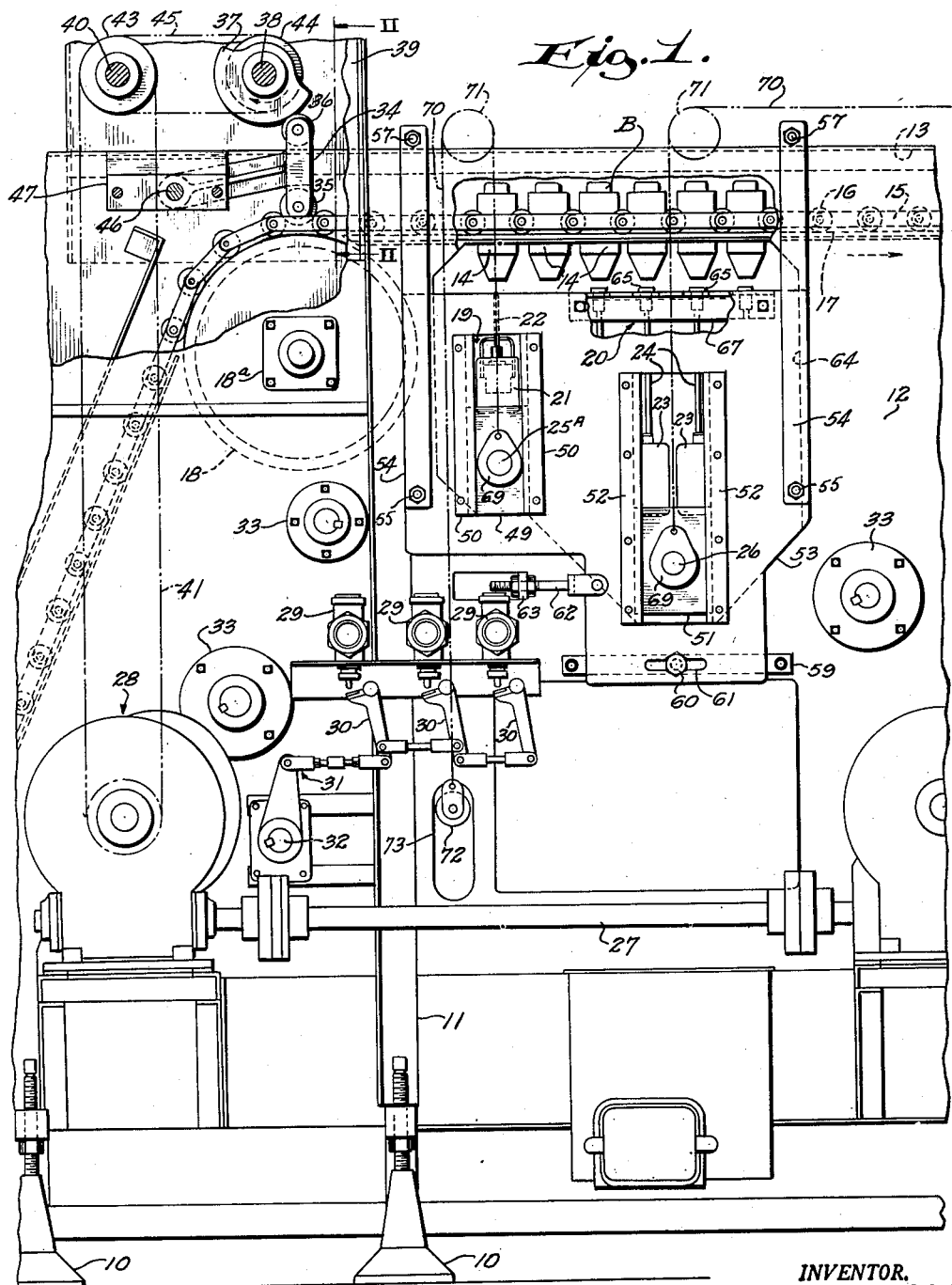
Fig. 1 is a fragmentary view in side elevation, with parts broken away for clarity in illustration, of the rinsing and cleansing stations of a bottle-washing machine embodying the present invention.

Referring to the drawings by reference numerals, the bottle-washing machine, in its conventional aspects, comprises a body with vertical supports 11, horizontal upper supports 13, and sides 12, all supported on adjustable feet 10. The bottles B are carried on a conveyor consisting of bottle carriers 14 which extend between the links of two spaced parallelly arranged endless chains 15. These chains, because of the weight carried by them, are preferably provided with rollers 16 which ride on angle iron tracks 17 secured to the sides 12. The chains are driven by sprockets (not shown) in the direction indicated by the arrow and advanced by steps equal to the pitch or link of the chain. The mechanism for accomplishing this is well known and is shown in Patent 2,340,465, issued February 1, 1944, to Charles L. Gerlach, and is not described herein. In other words, the chain is moved forwardly between each stop the distance between two adjacent bottle carriers 14. As the conveyor enters the rinsing and cleansing stations, it passes over idler pulleys 18 to accomplish a change of direction. The rinsing station is designated generally at 19 and the cleaning station is designated generally at 20. In the rinsing station 19 there is positioned a rinsing head 21 having a series of nozzles 22 spaced lengthwise of the head. The head 21 is supported so that it may be raised and lowered to cause the nozzles 22 to enter into the necks of bottles positioned in the bottle carriers 14. Water under pressure is distributed by the head 21 and forcibly ejected through the nozzles 22 against the insides of the bottles for the rinse. In the cleansing station 20 the cleansing head is a unit comprising four heads 23, each of which supports a plurality of cleansing nozzles 24 spaced longitudinally of the heads. The ends of the heads 23 are supported by transverse members 25 to create a unit. The heads 23 act as mixing chambers for water and air or steam under pressure which mixture is forcibly ejected through the tips of the nozzles 24. As the cleansing head is raised this mixture is forced against the insides of the bottles B in the conveyor to accomplish the final cleansing. The description of the mixing heads and the particular shape of the nozzles are set forth in detail in United States Patent 1,978,721, issued October 30, 1934 to Frank P. Perkins. The conventional mechanism for raising and lowering the rinsing and cleansing heads is not shown or described herein. It is accomplished by cam-controlled levers which act upon the respective shafts 25a and 26 mounted in the guide plates 49 and 51. Various shaft bearings 33 secured to the sides 12 form a support for the raising and lowering mechanism. A detailed description of the type of cam and lever action used for this function is found in Patent No. 1,729,193, issued September 24, 1929, to Henry F. Stock. The mechanism for advancing the conveyor by steps (also conventional and not shown) is connected with the worm and gear and cam, shown generally at 28, for raising and lowering the heads by jack shaft 27. The valves 29 for controlling the admission of water and air to the rinsing and cleansing heads are simultaneously operated, through levers 30 controlled by a linkage and lever mechanism indicated at 31, by shaft 32 synchronized with the raising and lowering mechanism.

The advancing mechanism moves the conveyor forward in steps a link in length. As soon as the conveyor is brought to rest by the advancing mechanism, the raising and lowering mechanism raises the cleansing and rinsing heads. As the nozzles enter the openings of the bottles the valves 29 operate and the rinsing water and cleansing mixture is projected against the insides of the bottles. When the heads have reached their upper limit (the nozzle just clear of the bottom of the bottle), they are lowered and the valves turned off as the nozzles leave the bottle openings. This procedure requires a close alinement between the nozzles and the bottle openings as each set of carriers is brought into the stations.

In conveyors of this type there is need for a certain amount of slack in the chain, and as the result of this and of the inherent tendency of a chain to overrun when stopped only by its driving sprocket, the conveyor develops a "creep." The amount of this creep varies with each stop. Sometimes there is no "creep." Sometimes the bottle carriers will stop in advance and sometimes beyond the desired place in the stations. When misalinement occurs, breakage of bottles results. To overcome the effect of this creep, there is pivoted to the bottle-washing machine a pair of chain positioners 34. The positioners 34 have a pair of spaced rollers 35 and 36. The rollers 35 ride on the chain 15 up, over, and in between the rollers 16. Whenever the rollers 35 are in the position shown in Figs. 1 and 2 (evenly contacting two successive rollers 16), the links of the chain 15 will be set in predetermined positions relative to the bottle-washing machine. If the chain 15 did not come to rest in this position, then the rollers 35 would be in contact with only one of the chain rollers 16 of a link. The application of force to the rollers 35 driving them toward the chain will move the chain until the rollers 35 evenly contact adjacent rollers 16 of a link. The force necessary to accomplish this is applied to the positioners 34 by cams 37 acting on rollers 36. The cams 37 are mounted on a shaft 38 supported in extensions 39 fastened to the sides 12. The cams 37 and shaft 38 are rotated in synchronism with the head raising and lowering mechanism and the advancing mechanism by a shaft 40, also rotatively supported in the extensions 39 and rotated by chain 41 and sprocket 42 from the worm and gear mechanism 28, the shaft 40 being connected with the shaft 38 by the respective sprockets 43 and 44 and chain 45. For substantially one half a revolution of the cams 37 the rollers 36, and consequently the positioners 34, are free to raise upwardly. During this one half revolution, the chains 15 are being advanced one link and the rollers 35 ride up and over the chain rollers 16. At the end of this one half revolution, the advancing mechanism stops the conveyor and immediately the cams 37 urge the positioners 34 downwardly so that the rollers 35 are forced between adjacent chain rollers 16, as previously described. The positioners 34 are held in the locked position substantially throughout the remaining one-half revolution. During this latter one-half revolution, the rinsing and cleansing heads are operated as described. Each of the positioners 34 is independently pivoted on short shafts 46 which are mounted in blocks 47 secured to the sides 12. Angle members 48, having one flange secured to the horizontal supports 13 and the other flange extended downwardly, form supports for the inner end of each of the shafts 46. By reason of these fixed pivots between the bottling machine frame and the positioners 34, there is accomplished a relatively fixed place for the stoppage of the conveyor.

Once there has been established a fixed place at which each bottle carrier successively comes to rest, it is then only necessary to adjust the rinsing and cleansing heads so that the nozzles supported thereby are in axial alinement with the openings of the bottles in the carriers. To do this the heads are supported so that they have adjustment in either direction along the line of travel of the conveyor. Each end of the rinsing head 21 is provided with a guide plate 49 which is mounted and guided for vertical sliding movement in a pair of oppositely related guides 50. The cleansing head has a guide plate 51 at each end thereof restrained to vertical sliding movement by oppositely related guides 52. When the guides 50 and 52 are fixedly spaced an amount which is exactly divisible by a desired number of links of chains 15, then when one head is properly alined with a bottle carrier the other head will be properly alined with another bottle carrier. To so fixedly space the guides 50 and 52 those on the same side of the machine are mounted in a sliding plate 53 on the respective side. The plates 53 are shaped as shown and suspended at their side edges by pairs of parallel links 54. Each link of a pair is positioned (see Fig. 4) on opposite sides of the plate 53 to balance the load. They are pivoted to the plate by bolts and nuts 55. The top of the links 54 are pivoted to the turned ends 57 of supporting shafts 56 extending across the top of the machine. A spacer 58 is inserted between each link at their upper ends. As is shown most clearly in Fig. 4, the plates 53 are thus suspended parallel and spaced from the sides 12. In order to guide the plates 53 and maintain them in proper position relative to the sides 12 there are provided spaces and guides 59. The guides 59 have bolts 60 projecting through slots 61 to hold the plates 53 in the parallel position. The necessary adjustment of the plates 53 along the line of conveyor travel is accomplished by adjusting rods 62 pivotally connected to the plates 53 and having threaded ends inserted through projections 63 struck from the sides 12. Manipulation of nuts on opposite sides of the projections effects the adjustment and locking of the rod 62. The desired positioning of each of the plates 53 may thus be had. With this arrangement only one adjustment is necessary to bring both the rinsing head and the cleansing head into proper alinement with bottles in the bottle carriers locked in the rinsing and cleansing stations by the positioner 34. The sides 12 beneath the plates 53 are cut out at 64 to provide operating space for the connection between the heads and the respective guide plates 49 and 51. This opening also permits a clear view of the nozzles and the bottle carriers in the two stations.

The cleansing nozzles 24 are longer than the rinsing nozzles 22 and they are moved through greater distances in their normal operation. It is therefore advisable to guide the nozzles 24 at points near the bottoms of the bottle carriers. This is accomplished by individual nozzle guides 65 mounted in the transverse supports 66. The ends of the supports 66 are secured to an angle bracket 67 fastened to the upper portions of plates 53 by bolts 68.

It has been found desirable to offset the weight of the rinsing and cleansing heads by counterbalancing them. Each end of the shafts 25a and 26 is provided with a connecting plate 69 to which a roller chain 70 is secured. The chains 70 pass over sprockets 71 mounted in brackets on the top of the machine and connected with the ends of weights 72 extending across the machine and through slots 73 conveniently located in the sides 12. In connection with the counterweighting of the cleansing head 23 it has been found convenient to install pulleys 74 to enable the counter weight to be placed at a convenient point in the machine. The adjustment of the plate 53 is so relatively small that it does not in any way affect the operation of the counter weights.

Although only one embodiment of the invention is shown and described herein, it will be understood that this application is intended to cover such changes or modifications as come within the spirit of the invention or scope of the following claims.

I claim:

1. In a bottle-washing machine having an intermittently advanced chain conveyer for carrying bottles to and registering them with a bottle-treating station provided with sides, means in said station for treating said bottles including a plurality of nozzles mounted on a head, a plate adjacent each side and having a vertical guideway for each end of said head to guide said head toward and away from bottles carried by said conveyer to insert and withdraw said nozzles into and from said bottles, said plates being mounted for limited longitudinal movement with respect to said sides for adjustment back and forth in the path of movement of bottles carried by said conveyer, threaded means for adjusting said plates, means for locking said plates in adjusted position against longitudinal movement with respect to said sides, and means for locking said conveyer in bottle-registering position when stopped.

2. A bottle-washing machine as claimed in claim 1 in which the plates are movably suspended by parallel links pivotally secured to said sides and said plates so that as said plates are moved the axis of said guideway will remain parallel to its initial axial position.

CHARLES L. GERLACH.

REFERENCES CITED

The following references are of record in the file of this patent:

UNITED STATES PATENTS

| Number | Name | Date |
| --- | --- | --- |
| 1,200,999 | Strasburger | Oct. 10, 1916 |
| 1,232,175 | Baenninger | July 3, 1917 |
| 1,734,585 | Ladewig | Nov. 5, 1929 |
| 1,775,003 | Soelch | Sept. 2, 1930 |
| 2,225,429 | Dostal | Dec. 17, 1940 |
| 2,307,114 | Dichter | Jan. 5, 1943 |
| 2,351,183 | Blackburn | June 13, 1944 |